United States Patent [19]

Merino et al.

[11] 4,171,682

[45] Oct. 23, 1979

[54] ENCLOSURE FOR SMALL ANIMALS

[76] Inventors: Dennis H. Merino, 2844 King Edward Dr., El Dorado Hills, Calif. 95630; William D. Kalish, 4272 Elder Ave., Seal Beach, Calif. 90740

[21] Appl. No.: 693,413

[22] Filed: Jun. 7, 1976

[51] Int. Cl.² .............................................. A01K 1/03
[52] U.S. Cl. ......................................... 119/15; 119/18
[58] Field of Search ................... 119/17, 15, 18, 29; 43/61; 46/113, 204

[56] References Cited

U.S. PATENT DOCUMENTS

| | | | |
|---|---|---|---|
| 277,724 | 5/1883 | Hendryx | 119/17 |
| 389,364 | 9/1888 | Carpenter | 46/113 |
| 724,931 | 4/1903 | Phillips | 43/61 |
| 1,599,736 | 9/1926 | Wright | 46/113 |
| 1,887,869 | 11/1932 | Clampitt | 119/17 |
| 2,068,210 | 1/1937 | Walker | 119/33 |
| 2,441,906 | 5/1948 | Sagat | 46/204 |
| 2,640,460 | 6/1953 | Siegel | 119/17 |
| 3,682,477 | 8/1972 | McMahon | 119/29 |
| 3,791,346 | 2/1974 | Willinger et al. | 119/17 |
| 4,064,839 | 12/1977 | Rodemeyer et al. | 119/15 |

*Primary Examiner*—Richard C. Pinkham
*Assistant Examiner*—Lawrence E. Anderson
*Attorney, Agent, or Firm*—Gerald L. Price

[57] ABSTRACT

A cage type enclosure for small animals, such as guinea pigs, hamsters, gerbils, rats of the like which simulates the appearance and operation of an apparatus such as a vehicle having revolving and reciprocating members. The simulated apparatus includes a wheel rotated by the movement of the animal which reciprocates another component of the apparatus through interconnecting linkage. Rotation of the wheel may also simulate other features of the apparatus, such as other wheels, a bell, etc. Access is provided to the enclosure for feeding and watering the confined animals.

11 Claims, 3 Drawing Figures

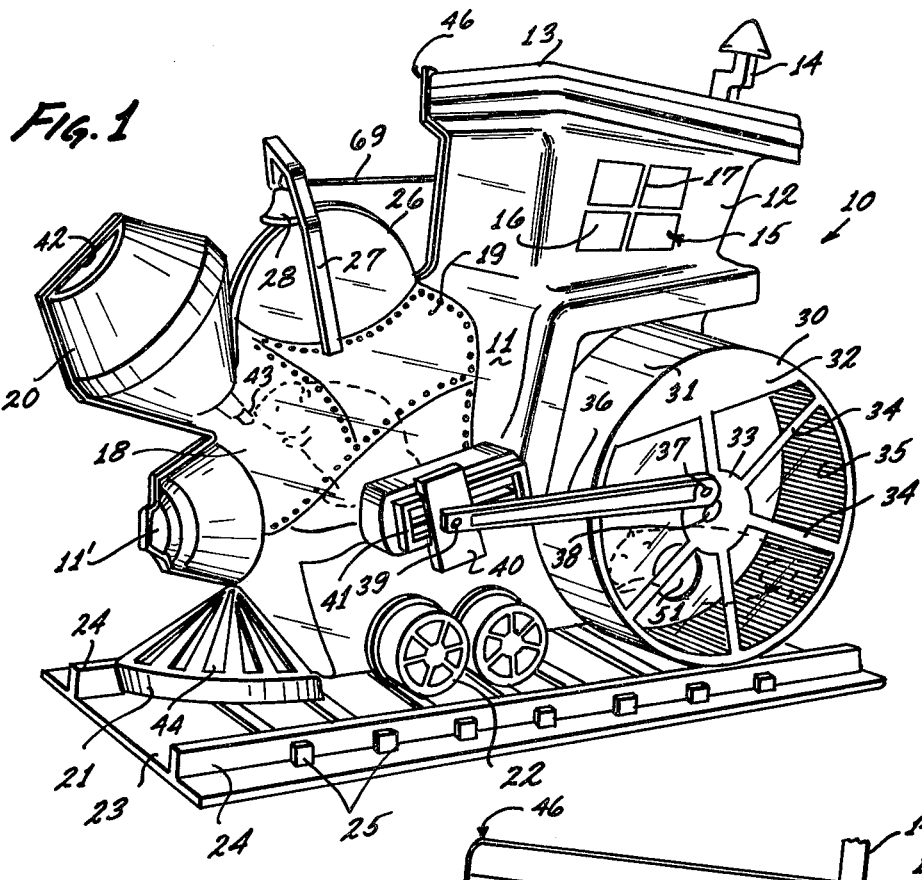
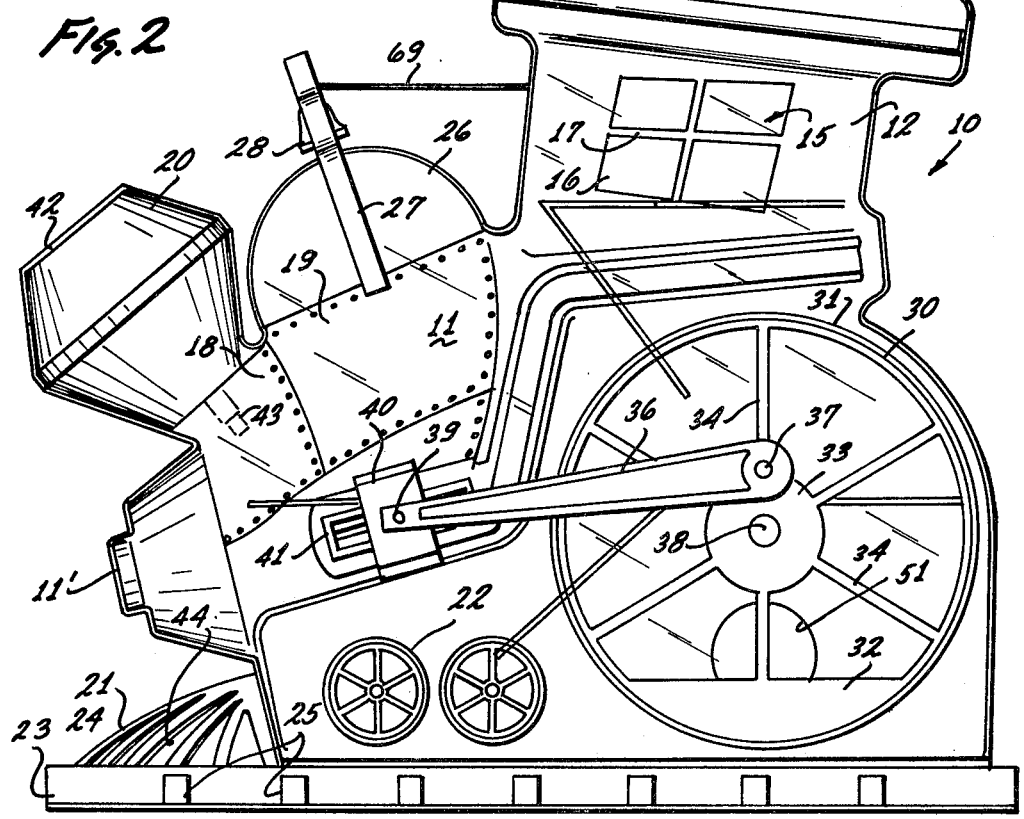

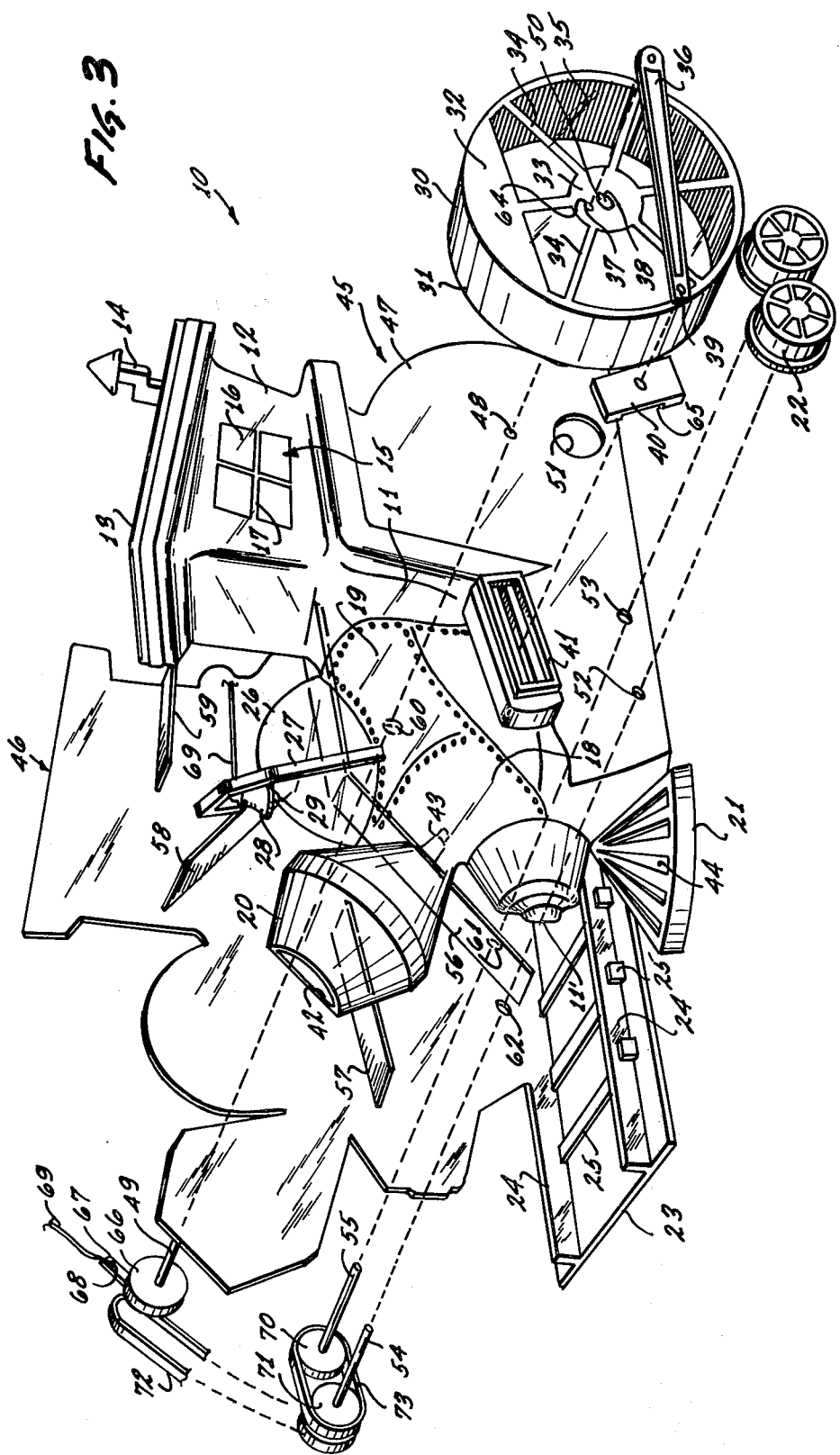

ENCLOSURE FOR SMALL ANIMALS

BACKGROUND OF THE INVENTION

The invention relates to enclosures for small animals; and, more particularly, to a cage type enclosure simulating a vehicle having a reciprocating member for the confinement of small animals usually kept for pets, such as hamsters, guinea pigs, gerbils, mice, rats, squirrels, and the like.

In the past, small house pets which required confinement, such as rats, mice, hamsters, gerbils, guinea pigs, squirrels, and the like were confined in small cages of a generally nondescriptive nature. These cages generally included a floor or base, that might be removable for cleaning, and a bar or screen enclosure with access into the interior thereof enclosing the floor or base.

Most of these animals require exercise to keep them healthy. Accordingly, such cages are often provided with wheels or other rotating members revolved by the activity of the animal therein. In recent years, there has been an increased interest in providing more exercising activities in such cages and, in addition, make such cages more interesting and aesthetically pleasing. In U.S. Pat. No. 3,742,908, there is depicted a system whereby one or more individual cages or enclosures may be connected by enclosed tubes or conduits to simulate a small animal town or the like. In addition to including various and numerous exercising activities for the animal or animals confined therein, the system, in simulating a small animal town or the like, added play value to the owner of the pet or pets, usually a small child. Thus, the child becomes actively involved in the activities of the pet or pets confined in such a system.

In view of the tremendous popularity of such systems, there is a need for more cages or enclosures which can be used alone as a totally independent unit or included in the system of the aforestated patent and which present different types of exercising activities while at the same time, adding sound and motion entertainment and educational value to the child or other owner or observer of the system.

SUMMARY OF INVENTION

It is an object of this invention to provide an enclosure which may be used individually or as part of a bigger system to confine a small pet or pets therein.

It is a further object of this invention to provide an enclosure which simulates a vehicle and having an exercising activity therein which reciprocates a simulated component of the vehicle.

It is still another object of this invention to provide an enclosure simulating a wheeled vehicle, such as a steam railroad locomotive, having a simulated part or component which reciprocates when a confined pet exercises on an exercise wheel in the cage and which may be accompanied by sound associated with the simulated vehicle.

It is a further object of this invention to provide such a cage type enclosure with a readily accessible interior for cleaning or the like and includes provision for feeding and providing water to the pet or pets therein without the necessity of dismantling or otherwise opening the cage.

It is also an object of this invention to provide an enclosure for small animals having both sound and educational value in addition to presenting a unique, interesting and aesthetic appearance.

These and other objects are accomplished by providing a stylized enclosure which includes a wheel rotated by the movement of the pet. This wheel may in turn rotate smaller wheels as, for example, simulated trucks of a locomotive where as the enclosure itself simulates the body thereof. The wheel may also indicate other activities associated with the simulated apparatus, such as ringing a bell. Access is provided in the cage for feeding and watering the pets without the necessity of opening the enclosure.

BRIEF DESCRIPTION OF THE DRAWINGS

Other objects and advantages of the invention will appear from the following description taken in conjunction with the accompanying drawings in which:

FIG. 1 is a perspective view depicting an exemplary enclosure embodying the features of the present invention;

FIG. 2 is a vertical, partly sectional, view of the exemplary enclosure illustrated in FIG. 1; and FIG. 3 is an exploded view of the exemplary enclosure illustrated in FIGS. 1 and 2.

While the present invention is susceptible of various modifications and alternative constructions, only the exemplary embodiments shown in the drawings will herein be described in detail. It should be understood, however, that it is not intended to limit the invention to the particular forms disclosed, but, on the contrary, the intention is to cover all modifications, equivalents, and alternative constructions falling within the spirit and scope of the invention as expressed in the appended claims.

DESCRIPTION OF THE PREFERRED EMBODIMENT

Referring now to FIGS. 1 and 2 of the drawings enclosure 10 is shown which includes a simulated wheeled vehicle, more particularly, an old time steam locomotive. Enclosure 10 may also simulate any vehicle or other device wherein such vehicle or device includes a reciprocating member and which may be accompanied by sound usually associated with the simulated device and vehicle. For example, enclosure 10 may simulate a fire engine, steamboat, a paddle wheel boat, a car, or a piece of machinery having reciprocating members.

Thus, still referring again to FIG. 1, in the exemplary embodiment of the invention, enclosure 10 simulates an old time steam locomotive having a main body portion 11 which includes a cab 12 having a roof 13 and a simulated chimney 14. A window 15 may be provided in cab 15, having open sections 16 formed by a frame 17 for allowing the pet or pets confined therein to look out of window 15.

A simulated engine portion 18 of the locomotive is integral with cab 12 and may include a simulated boiler 19 having a simulated smoke stack 20 and a simulated pilot or cowcatcher 21. Simulated trucks or wheels 22 are provided on the bottom of housing 11 which simulate trucks or wheels adapted to travel on rail tracks or the like. Housing 11 is mounted on a base 23 simulating a roadbed having a pair of simulated rails 24 or the like on which the locomotive is simulated as travelling. Simulated ties 25 or the like may be provided on rails 24 as shown. A simulated light 11' may be provided at the front of simulated engine.

A simulated bell tower 26 is also provided on housing 11 between smokestack 20 and cab 12 having a bracket or support 27 integral therewith supporting a bell 28 with a moveable clapper 29 therein, as will be further discussed.

A relatively large diameter rotating wheel 30 is provided on cage 10 below cab 12 and rearwardly of boiler 19. This wheel 30 simulates the large driving wheel of the locomotive.

As particularly contemplated in the present invention, reciprocating means are provided for reciprocating a portion or component of the simulated locomotive thus simulating an actual reciprocation of a component thereof. Further, such reciprocation, as will be discussed, simultaneously rotates wheels 22 and rings bell 28. In the exemplary embodiment of the invention, such reciprocation means includes the aforementioned wheel 30. Wheel 30 may include a generally smooth generally cylindrical main body portion 31, which may be enclosed along a portion of one or more sides thereof, as by a sidewall 32, having a central hub 33 and integral spokes 34. The inner surface of body portion 31 may be smooth or ribbed or otherwise roughened, as at surface 35, for enabling a small pet to rotate wheel 30, as will be hereinafter discussed. The reciprocating means further includes a piston rod in the form of an elongated member 36 pivotally connected at one end to hub 33 at a point or pivot 37 mounted off-center from the axis of rotation 38 of wheel 30. The opposite end of member 36 is pivotally connected via pivot pin 39 or the like to a slider box in the form of a U-shaped bracket 40 bearing against an abutement member 41 which may be an integral part of housing 11.

Before describing the reciprocating structure in detail, it can be seen in FIGS. 1 and 2 that the upper portion of the simulated smokestack 20 includes an opening 42 for introducing water into smokestack 20. The lower portion is generally conically shaped terminating in an apex or nipple 43 having a restricted opening for enabling the pet confined in enclosure 10 to obtain water, when desired.

The simulated cowcatcher 21 includes spaced openings 44 therein for permitting the insertion of food therebetween. For example, food for such pets as heretofore described is generally available in solid tablet form which food tablets can be easily inserted through openings 44 and thus into the interior of enclosure 10, when required.

Referring now more particularly to FIG. 3, the reciprocating means will be further described along with the assembly of enclosure 10 for a better understanding of the invention. As can be seen in FIG. 3, the enclosure 10 may be assembled from a body portion 45 enclosed by a back or body portion 46. Body portion 45, which includes the simulated chimney 14 and cowcatcher 21, cab 12, bell tower 26, engine 19 and smokestack 20, with cab 12, bell tower 26, boiler 19 and smokestack 20 being open on one side thereof until assembled. Body portion 45 also includes a generally flat inner partition wall 47 having an aperture 48 for receiving a rod or pin 49 therein, which pin 49 extends through aperture 50 in hub 33 when assembled. An access opening 51 is also provided in wall 47 so that the pet may travel to other sections of enclosure 10.

A pair of spaced apertures or holes 52, 53 are provided for receiving pins or rods 54, 55 therein which extend through apertures in wheels 22 when assembled. Body portion 46 includes the closing portion of cab 12, bell tower 26, engine 19 and smokestack 20. Inner partitions or bracing members 56 through 59 may be provided on body portion 46. Body portion 46 also includes, integral therewith, the simulated roadbed 23, rails 24, and ties 25. Apertures 60 through 62 may be provided on body portion 46 for receiving pins 49, 54 and 55 therethrough as will be discussed.

It is to be understood that body portions 45, 46 may be assembled together in any suitable manner to obtain the assembled enclosure of FIGS. 1 and 2. Further, body portions 45, 46 may be assembled in such a manner as to be easily separated for cleaning the interior thereof. Thus, suitable animal bedding material, such as wood chips, shredded paper, etc., may be placed on simulated roadbed 23.

Returning once again to the discussion of the reciprocating means, when assembled, pin 49 extends through aligned apertures 60 and 48 and into aperture 50 of wheel 30 which both retains wheel 30 in the FIGS. 1 and 2 position and to fixed rotation thereto. This pin 49 may include any suitable means for retaining it in position but providing easy removal thereof, such as a threaded end having a cap threaded thereon not shown.

Pins 54 and 55 extend through aligned apertures 61, 53 and 62, 52 into suitable aligned apertures in wheels 22. Wheels 22 are fixed to pins 54, 55 for rotation therewith. Suitable easily removable retention means may also be provided on pins 54 and 55. Member 36 is coupled to wheel 30 by means of pivot pin 37 extending through aperture 64 in hub 33 and to member 40 by pivot pin 39 extending through aligned apertures in members 36 and 40. Member 36 may bear against member 40 which is retained in position against member 41. Member 40 includes a cut-out portion 65 which is configured to ride along the surface of member 41. If desired, cut-out portion 65 may include a peripheral flange (not shown) interlocking with a peripheral flange (also not shown) on member 41 to retain member 40, 41 in position. Of course, the length of member 41 is chosen depending upon the degree of reciprocation of member 36 on hub 33.

It can be appreciated that, when wheel 30 is rotated by the animal in enclosure 10, member 36 reciprocates on hub 33 and moves member 40 back and forth across member 41. In addition to simulating the movements normally associated with the vehicle or device being simulated, such as a locomotive, the child is simultaneously learning the principles of reciprocation in a pleasing and amusing manner.

As wheel 30 rotates, rod 49 also rotates. As particularly contemplated in the invention, the reciprocating means may include means for simultaneously ringing bell 28. In the exemplary embodiment of the invention, such means may include, as can be seen in FIG. 3, a pulley 66 fixed for rotation with rod 49. Pulley 66 may include an extension portion 67 fixed thereto and rotatable therewith. This extension portion 67 is mounted off-center on pulley 66 and may include an aperture 68 for securing an elongated flexible member, such as a wire or string 69 thereto. The other end of string 69 is secured to bell 28. Suitable guide means (not shown) may be provided on main body portion 45 for guiding string 69. It can be seen that, as pulley 66 rotates due to wheel 30 being rotated, portion 68 reciprocates or rotates and pulls string 69 which simultaneously rings bell 28.

The reciprocating means, as particularly contemplated in the invention, further includes means for rotating wheels 22. In the exemplary embodiment of the invention, such means includes a single pulley 70 fixed for rotation to pin 55 and a double pulley 71 fixed for rotation to pin 54. A rubber band 72 or the like encircles pulley 66 and the outer sheave of pulley 71 so that pulley 71 rotates when pulley 66 is rotated. A second rubber band 73 or the like encircles the other or inner sheave of pulley 71 and pulley 70 so that rotation of pulley 71 also rotates pulley 70. When pulleys 70, 71 are thus rotated, wheels 22 also rotate. Thus, rotation of wheel 30 by the animal simultaneously reciprocates members 36, 40, rotates wheels 22 and rings bell 28 adding much interest, animation and educational value to enclosure 10. Of course, any suitable drive means may be provided for converting rotation of pulley 66 to rotation of wheels 22.

The various components, i.e., pulleys 66, 70, 71 and bands 71, 72 may be disposed internally of enclosure 10 with the ends of pins 54, 55 extending out of back 46 and retained therein in any suitable manner.

It can be seen from the foregoing that there has been described an enclosure for a small animal that simulates a device or vehicle having rotating, reciprocating and sound actions associated therewith. At the same time, access is provided for adding water and food to the cage and it may be easily and quickly disassembled for cleaning. In addition to being attractive and amusing, the enclosure 10 has educational value in teaching principles of reciprocation. The enclosure may be made of any suitable materials, such as durable clear or colored plastic. All or certain portions of the cage may be visible from the exterior depending on the materials selected. Decals may be provided for additional play value so that the child may add the decals to the cage to further simulate or bring out the various external features thereof. Bell 28 may be detached if ringing thereof is undesirable by merely untying string 69 therefrom and retying, when desired.

Enclosure 10 includes a number of open areas for viewing the pets therein and provides air to the pets. As discussed, enclosure 10 may be coupled in the system discussed in the aforestated patent by the techniques discussed in that patent. Portions 45, 46 may be snapped together for easy assembly and disassembly, as is well known in the art, or otherwise removably secured together, such as by suitable screws, nuts, bolts, apertures and the like.

What is claimed is:

1. An enclosure for confining, feeding, watering and exercising small animals, such as guinea pigs, hamsters, gerbils, rats or the like comprising:
   a. a generally hollow normally stationary generally closed housing simulating an apparatus having revolving and reciprocating members;
   b. a rotatable wheel mounted for rotation on said housing without effecting propulsion of the enclosure, said wheel being of a size sufficient to receive said small animal therein for providing means for an animal to exercise, said wheel having an outer wheel portion with an inner portion in communication with the interior of said housing, the outer wheel portion including a hub rotatably connected to said housing, said wheel simulating the rotation of a component of said apparatus by virtue of an animal exercising in said inner portion;
   c. a first reciprocating member pivotally mounted at one end to said outer wheel portion at a point off center from the axis of rotation of said wheel and pivotally mounted at the other end to a second reciprocating member linearly movable back and forth along an exterior portion of said housing, the reciprocation of said first and second reciprocating members simulating the reciprocation of a component of the simulated apparatus;
   d. the apparatus being a simulated vehicle, wherein said rotatable wheel simulates a revolving wheel of said simulated vehicle, and said reciprocating members simulate reciprocating components of said simulated vehicle; and
   e. liquid reservoir means integral with the housing and simulating a functional feature of the simulated vehicle and having exteriorly disposed access means for filling the interior thereof with liquid and a restricted opening at the lower end thereof opening into the interior of said simulated vehicle.

2. In the cage of claim 1 wherein said apparatus being simulated is a vehicle, said rotatable wheel simulates a revolving wheel of said simulated vehicle, and said reciprocating members simulate reciprocating components of said simulated vehicle.

3. In the enclosure of claim 1 wherein said housing includes a restricted opening therein for providing access to the interior of said housing.

4. In the enclosure of claim 1 wherein said simulated vehicle is a simulated locomotive, said wheel simulating a relatively large diameter wheel associated with said vehicle, said simulated locomotive including a simulated cab house having a window opening to the interior thereof, a simulated engine integral with said cab house, a simulated cowcatcher at the forward end of said engine, a simulated bell tower on the upper surface of said engine, a simulated smokestack on said engine forward of said bell tower, simulated trucks on said vehicle, and a base simulating a roadbed having railroad tracks thereon supporting said simulated locomotive.

5. In the enclosure of claim 4 wherein said simulated smokestack includes a hollow member associated with said engine.

6. In the enclosure of claim 5 wherein said simulated cowcatcher includes limited access means for providing limited access to the interior of the cowcatcher.

7. In the enclosure of claim 6 wherein said limited access means includes slots in said simulated cowcatcher.

8. In the enclosure of claim 4 further including said simulated trucks being rotatable with respect to said simulated vehicle, and rotation transmitting means associated with said wheel for transmitting rotation of said wheel to said trucks.

9. In the enclosure of claim 8 wherein said rotation transmitting means includes a pulley rotatable with said wheel, pulley means coupled to said trucks for rotation therewith, and motion transmitting means coupled between said pulley and said pulley means.

10. In the enclosure of claim 4 further including said simulated bell tower having a sounding device associated therewith, and sounding means coupled to said wheel for sounding said sounding device upon rotation of said wheel.

11. In the enclosure of claim 10 wherein said sounding means includes a rotatable member mounted to said wheel for rotation therewith, and a flexible elongated member coupled to both said rotatable member and said sounding device.

* * * * *